United States Patent Office 3,781,211
Patented Dec. 25, 1973

3,781,211

MAGNETIC COATING COMPOSITION

Virgil Allan Lohoff, Santa Clara, Calif., assignor to Memorex Corporation, Santa Clara, Calif.

No Drawing. Filed Aug. 10, 1972, Ser. No. 279,517
Int. Cl. H01f 1/26
U.S. Cl. 252—62.54 4 Claims

ABSTRACT OF THE DISCLOSURE

A fluid, heat curable thermosetting magnetic coating composition consisting of magnetic particles dispersed in a solution of three components which upon evaporation of the solvent and heating form a durable resin matrix having the magnetic particles dispersed in it. The three components in solution are an epoxy resin having a molecular weight of about 400–4000 per epoxy group, a polyamine containing at least one primary amine group and a polyvinyl acetal resin. The solvent must be capable of dissolving the three components, must be inert to them at temperatures up to solvent boiling point and must consist to the extent of at least 33 volume percent of diethylene glycol dimethyl ether.

BACKGROUND OF THE INVENTION

Magnetic coating compositions have been made with both thermoplastic and thermosetting binder systems and many have desirable properties for particular usages. However, a very large proportion of these systems do not meet the rigorous demands made on a binder applied to a magnetic disc and fail for one or more reasons related to magnetic properties of the disc, ability to withstand physical abrasion and repeated head loadings, and/or poor or substandard application properties; that is, desirable coating application properties necessary to properly apply the coating to supporting members.

The property requirements of a magnetic coating are extremely rigorous in the case where the coating is to be used for making the magnetic recording layers for use in "flying head" memory systems, such as the IBM 3330 and Memorex 670 Disc Storage Systems. With this type of memory system, magnetic layers are supported on a rigid disc, usually made of aluminum, and the disc is rotated rapidly at 3600 r.p.m., for example, while a magnetic head is caused to fly aerodynamically over the disc surface. The extremely high rotational speed, plus the high relative speed of head and disc surfaces, cause most magnetic coatings to shed oxide from the coating and head crashing with resultant damage to the magnetic head and to the magnetic coating is commonly experienced. Lack of toughness, adhesion to the aluminum or other substrate, impact resistance, long-term "head-loading" ability and resistance to commonly used disc cleaning solvents are other shortcomings that most magnetic coatings exhibit.

SUMMARY OF THE INVENTION

In accordance with this invention, a magnetic coating composition is provided which is remarkably well adapted for use in coating memory discs. This coating provides a magnetic recording surface which can be used for very long periods without head crashing, and can withstand long-term repeated "head loadings" without loss of magnetic signals. The coating can be applied to the disc support by spin coating, spray coating, roll coating or knife coating. The coating is especially well adapted to application by the spin coating technique. Additionally, this coating is very resistant to typical solvents, such as isopropyl alcohol used for cleaning discs and magnetic heads.

A tough, impact resistant magnetic coating with excellent solvent resistance, excellent application and flowout properties, as well as good adhesion to aluminum and other type substrates, is prepared by coating a support with a dispersion of magnetic particles in a solution of an epoxy resin, a primary amine and a polyvinyl acetal resin in a solvent which consists to the extent of at least 33 volume percent of diethylene glycol dimethyl ether, then evaporating the solvent and heating the coated support at a temperature and for a time sufficient to cause interaction of the organic components of the coating.

The epoxy resins useful in the invention are those having an average of between one and three epoxy groups per molecule and a molecular weight per epoxy group of between 400–4000 approximately. Preferably, the epoxy resin is a product of condensation of epichlorohydrin and bisphenol A, having the overall formula:

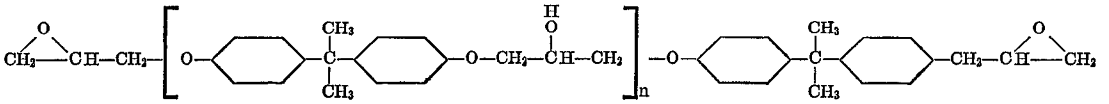

Where $n$ is an integer between 2 and about 10. A preferred resin as described above and used in this invention is sold by Shell Chemical Corporation under the trade name Epon 1001, it has an epoxide equivalent weight (molecular weight divided by the number of epoxy groups per molecule) of 425–550 and melting point of 65–75° C. Other epoxy resins which may be used instead of Epon 1001 are: Shell's Epon 1004 and Epon 1007 (Epon 1007 has an equivalent weight of 1900–2450 and a melt index of 125–135° C.), Dow Chemical's D.E.R. 661 and 664, Ciba Araldite 6071 and 6084, Union Carbide's EER–2011 and EER–2013, General Mills' Gen. Epoxy 525 and Gen. Epoxy 925, Jones-Dabney Epirez #520 and #530–C and Reichhold's Epotuf 6301 and 6304.

The polyvinyl acetals used in this coating composition are prepared from the reaction of aldehydes and polyvinyl alcohols. Polyvinyl alcohols are synthetic resins of high molecular weight that contain varying concentrations of hydroxyl and acetate groups produced in the usual manner by hydrolyzing polyvinyl acetate. The conditions of the acetal reaction and the concentration of the particular aldehyde and polyvinyl alcohol used are closely controlled to form polymers having a predetermined proportion of hydroxyl groups, acetate groups and acetal groups. The final product may be presented in a stylized structure as follows:

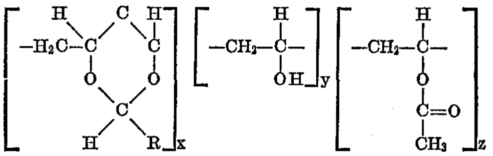

The values of $x$, $y$ and $z$ are such that the mol percents of acetal, alcohol and acetate in the polymer are in the respective ranges 75–85 mol percent, 19–25 mol percent and 0.5–3.0 mol percent.

The preferred polyvinyl acetal resins are polyvinylbutyral resins which are manufactured by Monsanto Chemical Co. under the trade name Butvar resins. The molecular weight of these resins can be varied considerably: for instance, Butvar B–79 is from 34,000 to 38,000 in molecular weight (weight average) while B–72A type Butvar is from 180,000 to 270,000 molecular weight. Substantially all the Butvar type resins may be used for this coating composition; however, Butvar B–74 type with a molecular weight of 100,000 to 150,000 is the preferred type.

The polyamine used has at least one primary amine group per molecule, and the presence of a primary amine has been found to be essential in obtaining a satisfactory coating. The preferred polyamine is N-aminoethylpiperazine which has a molecular weight of 130 and an equivalent weight of 43.3. Other amines can be employed: the ethylene polyamines, such as diethylenetriamine, ethylenediamine, and the like.

The proportions of the epoxy resin, polyvinyl acetal resin and amine components are as follows: the epoxide equivalent to amine equivalent ratio is in the range from 1/3 to 3/1. A preferred ratio of epoxide to amine is 1.2/1. The polyvinyl acetal resin added ranges from 10 wt. percent to 30 wt. percent of the total weight of epoxy resin, amine and polyvinyl acetal resin. Preferably, the polyvinyl acetal used amounts to 20 wt. percent of the total of the epoxy, amine and polyvinyl acetal weights.

In order to prepare a coating composition based on the use of an epoxy resin, a polyvinyl acetal resin and a primary amine which had extremely good flow-out properties during coating application and which provided a coating free from radial coating streaks, it was necessary to use a solvent containing at least 33 volume percent diethylene glycol dimethyl ether. Various carbitol, cellosolve and hydrocarbon solvents and mixtures of them had the capability to dissolve the epoxy, acetal and amine materials at suitable concentrations and viscosities to provide an adequate carrier for the dispersed magnetic particles but would not coat the supports smoothly and free from radial coating streaks. Numerous solvents were tested, without success, before it was discovered that the employment of a solvent containing at least 33 volume percent and up to 70 volume percent diethylene glycol dimethyl ether gave greatly improved flow-out properties and provided a coating free from radial streaks. It is not clear how or why the diethylene glycol dimethyl ether improves the physical properties of the composition, but it may be speculated that a physical coaction of the ether with the polyvinyl acetal resin gives rise to the improvement. The solvent is employed in amounts such that the viscosity of the total coating composition is in the range 150 to 500 cps. as measured by a Brookfield viscometer using a #2 spindle at 20 r.p.m. and at 24° C. The solvent must contain at least 33 and preferably not above 70 volume percent diethylene glycol dimethyl ether. At diethylene glycol dimethyl ether concentrations above 70 volume percent it becomes difficult to get sufficient of the organic components into solution.

Magnetic oxide particles are preferably put into the coating composition at between 60 and 400 parts of magnetic oxide by weight per 100 parts by weight of binder, and between about 100 and 400 parts of volatile solvents per 100 parts of combined oxide and binder mixtures. Various types of magnetic oxide particles can be used; the magnetic particle employed in the illustrations to follow is one manufactured by Charles Pfizer Company and is sold as MO–2530. This magnetic particle has a specific magnetic moment of 75 emu/gm. (minimum) and a coercive force ($H_c$) of from 285–305 oersteds.

A small amount of finely divided abrasive material, such as flint, garnet, silicon carbide or alumina, as described in U.S. Pat. No. 3,622,386, is desirably incorporated in the coating composition. The amount of abrasive material is usually in the range of 1–10% by weight of the total coating composition excluding solvent.

DETAILED DESCRIPTION

The following examples are set forth to better illustrate the preparation of magnetic recording media in accordance with this invention. Example I represents the general process and Example II represents a similarly processed formula which has excellent physical properties and permits heads to fly continually without crashing.

Example I

The proportions of the several components were as tabulated below:

| Component | Parts by weight | Solids, wt. percent total solids |
|---|---|---|
| Magnetic oxide (Pfizer MO–2530) | 47.2 | 47.2 |
| 60% Epon 1001 in Cellosolve | 59.0 | 35.2 |
| 10% Butvar B–74 in Cellosolve | 94.0 | 9.4 |
| Abrasive particles (alumina) | 5.6 | 5.6 |
| 100% N-aminoethylpiperazine | 2.6 | 2.6 |
| Cellosolve acetate | 52.3 | |
| Diethylene glycol dimethyl ether | 105.0 | |
| Total | 365.7 | 100.0 |

The magnetic dispersion was prepared according to the following procedure: 47.2 parts of magnetic oxide were added to 52.3 parts of Cellosolve acetate and this mixture was stirred for 2–4 hours, Then 38.2 parts of 60% Epon 1001 were added and this mixture was milled until free of agglomerates. 20.8 parts of Epon 1001 (60%), 94.0 parts of 10% Butvar B–74, and 5.6 parts of abrasive particle were then stirred into the milled mixture. Finally, 2.6 parts or N-aminoethylpiperazine, plus 105.0 parts of diethylene glycol dimethyl ether, were added to adjust the final viscosity of the total mixture to approximately 300 cps. at 24° C. as measured by Brookfield viscometer using #2 spindle at 20 r.p.m.

The coating was then applied to an aluminum disc by spin coating technique and the coated disc was baked for approximately 3 hours at 220° C. Upon cooling, the disc was polished to under a 2 micro-inch finished as measured by a "Clevite" surface roughness analyzer. A disc pack was assembled, consisting of 10 discs made as above described (1 servo side and 19 data sides), plus 2 cover discs. These were used in the IBM 3330 disc drive and in the MRX 670 disc drives. These drives were connected to controller units which, in turn, are utilized by the IBM 370 computer system.

Example II

A coating having the composition tabulated below was prepared following the procedure of Example I.

| Components | Parts by weight | Solids, wt. percent total solids |
|---|---|---|
| Magnetic oxide | 47.2 | 47.2 |
| 60% Epon 1001 in Cellosolve | 59.0 | 35.2 |
| 10% Butvar B–74 in Cellosolve | 94.0 | 9.4 |
| Abrasive particle (alumina) | 5.6 | 5.6 |
| 100% N-aminoethylpiperazine | 2.6 | 2.6 |
| Cellosolve/hexanol/xylene=80/10/10 | 52.3 | |
| Diethylene glycol dimethyl ether | 105.0 | |
| Total | 365.0 | 100.0 |

Discs made with the formulas shown in Examples I and II have been tested in a head loading tester using a MRX 670 ceramic head and have successfully passed through 50,000 cycles with no apparent sign of deterioration.

What is claimed:

1. A magnetic coating composition consisting essentially of a dispersion of magnetic particles in a solution of an epoxy resin having an average of between one and three epoxy groups per molecule and having an epoxy equivalent in the range 400–4000, a polyvinyl acetal resin having a molecular weight in the range 34,000–270,000 and an amine selected from the group consisting of the ethylene polyamines and N-aminoethyl piperazine in a solvent containing from 33 to 70 volume percent diethylene glycol dimethyl ether, the polyvinyl acetal amounting to 10–30 weight percent of the combined weights of epoxy resin, amine and polyvinyl acetal resin, the ratio of equivalents of epoxy resin to equivalents of amine being in the range 1/3 to 3/1 and the solvent being present in amounts such that the Brookfield viscosity using a #2 spindle, 20 r.p.m., 24° C. is in the range 150 to 500 cps.

2. A composition as defined in claim 1 wherein the polyvinyl acetal resin is polyvinyl butyral.

3. A composition as defined in claim 1 wherein the polyvinyl acetal resin is polyvinyl butyral and the amine is N-aminoethyl piperazine.

4. A composition as defined in claim 1 wherein the epoxy resin has an epoxy equivalent weight about 500, the polyvinyl acetal is polyvinyl butyral having a molecular weight in the range 100,000–150,000 and the amine is N-aminoethyl piperazine.

References Cited

UNITED STATES PATENTS

| | | | |
|---|---|---|---|
| 2,914,480 | 11/1959 | Hagopian ---------- | 252—62.54 |
| 3,148,082 | 9/1964 | Di Ricco et al. ----- | 252—62.54 |
| 3,630,910 | 12/1971 | Akashi et al. ----- | 252—62.54 |
| 3,650,828 | 3/1972 | Higashi et al. ----- | 252—62.54 |

DANIEL E. WYMAN, Primary Examiner

A. P. DEMERS, Assistant Examiner

U.S. Cl. X.R.

117—235; 260—37 EP, 37 N